United States Patent
Nozawa

(10) Patent No.: US 8,570,299 B2
(45) Date of Patent: Oct. 29, 2013

(54) TOUCH PANEL AND TOUCH PANEL TYPE DISPLAY DEVICE

(75) Inventor: Junichi Nozawa, Kirishima (JP)

(73) Assignee: Kyocera Corporation, Kyoto (JP)

(*) Notice: Subject to any disclaimer, the term of this patent is extended or adjusted under 35 U.S.C. 154(b) by 924 days.

(21) Appl. No.: 12/666,248

(22) PCT Filed: Jun. 28, 2008

(86) PCT No.: PCT/JP2008/061779
§ 371 (c)(1),
(2), (4) Date: Dec. 22, 2009

(87) PCT Pub. No.: WO2009/001946
PCT Pub. Date: Dec. 31, 2008

(65) Prior Publication Data
US 2010/0321329 A1    Dec. 23, 2010

(30) Foreign Application Priority Data

Jun. 28, 2007 (JP) ................................. 2007-169901
Jun. 28, 2007 (JP) ................................. 2007-169902

(51) Int. Cl.
G06F 3/045    (2006.01)

(52) U.S. Cl.
USPC ....................................................... 345/174

(58) Field of Classification Search
USPC ............. 345/174, 173; 428/328, 450; 341/20; 313/495; 445/24
See application file for complete search history.

(56) References Cited

U.S. PATENT DOCUMENTS

| 4,560,615 | A  | * | 12/1985 | Saito et al. ..................... 428/328 |
| 5,181,030 | A  | * | 1/1993  | Itaya et al. ....................... 341/20 |
| 6,458,463 | B1 | * | 10/2002 | Yoshioka et al. ............. 428/450 |
| 6,472,020 | B1 | * | 10/2002 | Yoshioka et al. .......... 427/407.1 |
| 6,473,074 | B1 | * | 10/2002 | Okahashi ...................... 345/174 |

(Continued)

FOREIGN PATENT DOCUMENTS

| JP | 62-147520 | 7/1987 |
| JP | 09-081302 | 3/1997 |

(Continued)

OTHER PUBLICATIONS

Taiwanese office action dated Feb. 21, 2012 and its English language translation issued in corresponding Taiwan application 097124615 cites the U.S. patents and foreign patent documents above.

(Continued)

Primary Examiner — Fred Tzeng
(74) Attorney, Agent, or Firm — DLA Piper LLP (US)

(57) ABSTRACT

The present invention is related to a touch panel comprising: a first base that includes a first resistance film; a second base that includes a second resistance film; a conductor that is electrically connected to at least one of the first resistance film and the second resistance film; and a spacer that is interposed in a first facing area where the first resistance film faces the second resistance film. The spacer is also interposed in a second facing area where at least one of the first resistance film and the second resistance film faces the conductor. The present invention may further include an insulating film interposed in the second facing area, instead of the spacer interposed in the second facing area. The component materials of the insulating film are the same as those of the spacers.

19 Claims, 7 Drawing Sheets

(56) References Cited

U.S. PATENT DOCUMENTS

| | | | |
|---|---|---|---|
| 6,517,399 B1 * | 2/2003 | Ito et al. | 445/24 |
| 6,529,188 B1 | 3/2003 | Suzuki | 345/173 |
| 6,721,019 B2 | 4/2004 | Kono et al. | 349/12 |
| 6,969,264 B2 | 11/2005 | Fujii et al. | |
| 7,071,926 B2 * | 7/2006 | Kusuda et al. | 345/173 |
| 7,138,758 B2 * | 11/2006 | Ando et al. | 313/495 |
| 7,184,027 B2 | 2/2007 | Sato et al. | |
| 7,248,249 B2 * | 7/2007 | Kong et al. | 345/173 |
| 7,429,821 B2 * | 9/2008 | Ando | 313/495 |
| 7,449,828 B2 * | 11/2008 | Ando et al. | 313/495 |
| 7,459,841 B2 * | 12/2008 | Kojima et al. | 313/495 |
| 7,548,017 B2 * | 6/2009 | Ando | 313/495 |
| 2001/0043291 A1 | 11/2001 | Kono et al. | 349/12 |
| 2003/0043122 A1 | 3/2003 | Suzuki | 345/173 |
| 2010/0315372 A1 * | 12/2010 | Ng | 345/174 |

FOREIGN PATENT DOCUMENTS

| | | |
|---|---|---|
| JP | 2001-249766 | 9/2001 |
| JP | 2001-296971 | 10/2001 |
| JP | 2002-041231 | 2/2002 |
| JP | 2002-196886 | 7/2002 |
| JP | 2005352632 A | 12/2005 |
| TW | 200417929 A | 9/2004 |

OTHER PUBLICATIONS

Japanese language office action dated Oct. 2, 2012 and its English language translation issued in corresponding Japanese application 2009520657 cites the foreign patent document above.

* cited by examiner

TOUCH PANEL AND TOUCH PANEL TYPE DISPLAY DEVICE

CROSS-REFERENCE TO THE RELATED APPLICATIONS

This application is a national stage of international application No. PCT/JP2008/061779 filed Jun. 28, 2008, and claims the benefit of priority under 35 USC 119 to Japanese Patent Application No. 2007-169901 filed Jun. 28, 2007 and Japanese Patent Application No. 2007-169902 filed Jun. 28, 2007, the entire contents of all of which are incorporated herein by reference.

TECHNICAL FIELD

The present invention relates to a touch panel mounted on a display screen of a liquid crystal display and the like. More specifically, the present invention relates to a touch panel type display device having the touch panel mounted on a display device.

BACKGROUND ART

For example, As a touch panel type display device, for example, there is one having a touch panel mounted on a liquid crystal display device to detect input coordinates based on a resistance change caused by a pressing operation (for example, see Patent Document 1).

A touch panel used on a screen input type display device disclosed in Patent Document 1 has a structure in which a second substrate made of glass is arranged facing a first substrate made of a polyethylene terephthalate film. The first substrate includes a first resistance film made of ITO (Indium Tin Oxide) and a wire electrode electrically connected to the first resistance film on the surface facing the second substrate. The second substrate includes a second resistance film made of ITO and an inter-substrate connecting wire electrode electrically connected to the second resistance film on the surface facing the first substrate. The wire electrode of the first substrate and the inter-substrate connecting wire electrode of the second substrate are electrically connected through an electrically conductive adhesive member. The electrically conductive adhesive member is made of an adhesive material and electrically conductive particles embedded in the adhesive material. The electrically conductive particles are prepared by plating the surface of plastic particles with metal (e.g., gold, nickel).

Patent Document 1: Japanese Patent Application Laid-open No. 2002-41231

DISCLOSURE OF INVENTION

Problem to be Solved by the Invention

In the screen input type display device, unwanted contact may occur between the first resistance film and the second wire electrode positioned in a region facing the first resistance film. To suppress the occurrence of such a trouble, the shape of the first resistance film needs to be devised, for example, by patterning the first resistance film, so as not to face the second wire electrode. Devising the shape of the first resistance film deteriorates manufacturing efficiency.

An object of the present invention is to provide a touch panel and a touch panel type display device that can suppress unwanted contact between a resistance film and a wire electrode, and have superior manufacturing efficiency.

SUMMARY OF THE INVENTION

The present invention is related to a touch panel comprising: a first base that includes a first resistance film; a second base that includes a second resistance film; a conductor that is electrically connected to at least one of the first resistance film and the second resistance film; and a spacer that is interposed in a first facing area where the first resistance film faces the second resistance film.

The spacer is also interposed in a second facing area where at least one of the first resistance film and the second resistance film faces the conductor.

The present invention may further include an insulating film interposed in the second facing area, instead of the spacer interposed in the second facing area. The component materials of the insulating film are the same as those of the spacers.

The present invention further relates to a touch panel type display device including a display panel and the touch panel described above.

Advantage of the Invention

An example of a touch panel according to the present invention includes the spacer interposed in at least a part of the facing area where at least one of the first resistance film and the second resistance film faces the conductor. Another example of a touch panel according to the present invention includes an insulating film interposed in at least a part of the facing area where at least one of the first resistance film and the second resistance film faces the conductor. The touch panels according to the present invention thus can suppress unwanted contact between the resistance films and the conductor, even when external force (such as pressing force to make inputs with the touch panels) is applied to the touch panels. Therefore, the touch panels according to the present invention can suppress the occurrence of electrical failures.

When the spacer is interposed in the second facing area, the spacers in the first facing area and the second facing area can be formed in a single process. Alternatively, when the insulating film and the spacer are made of the same component materials, the insulating film can be formed in the same process as the spacer. The touch panels according to the present invention thus can be manufactured more efficiently than counterparts to suppress unwanted contact between the resistance films and the conductor in the second facing area by devising the shapes of the resistance films through patterning.

EXPLANATIONS OF LETTERS OR NUMBERS

Figure 1:
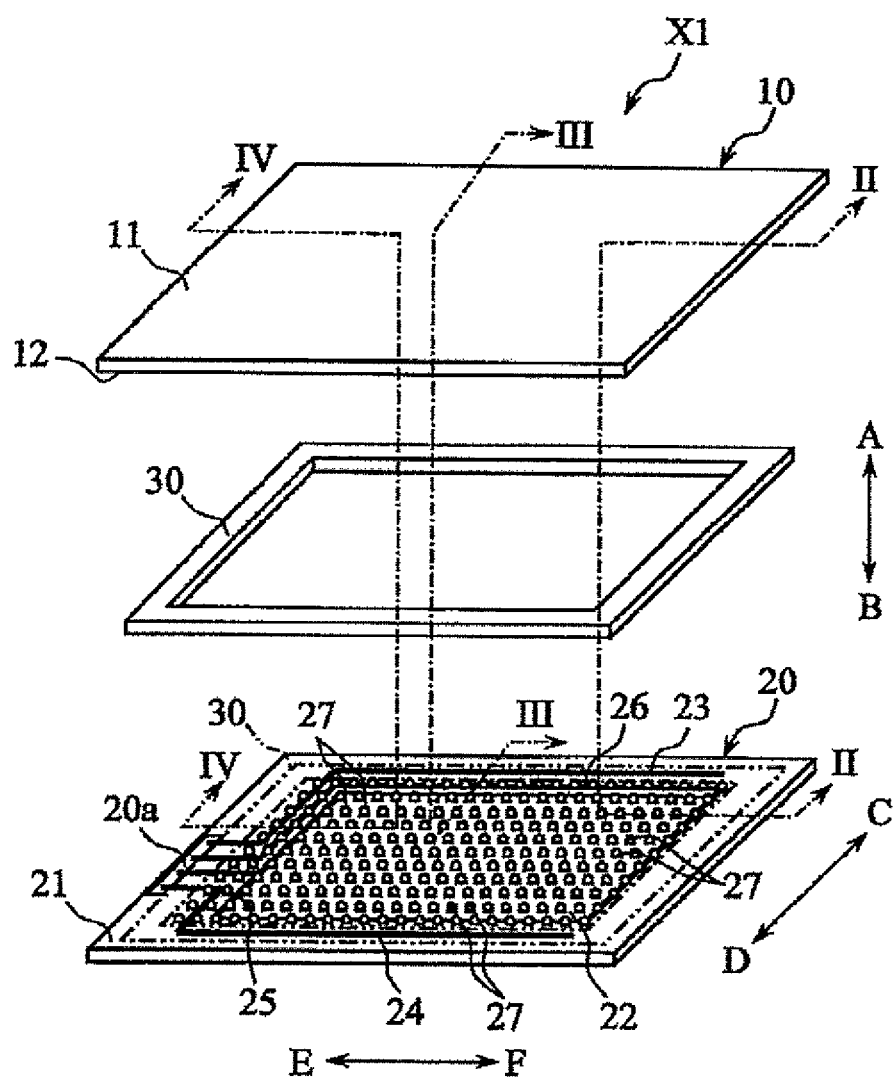
FIG. 1 is an exploded perspective view of a schematic configuration of an example of a touch panel according to a first embodiment of the present invention.
Figure 2:
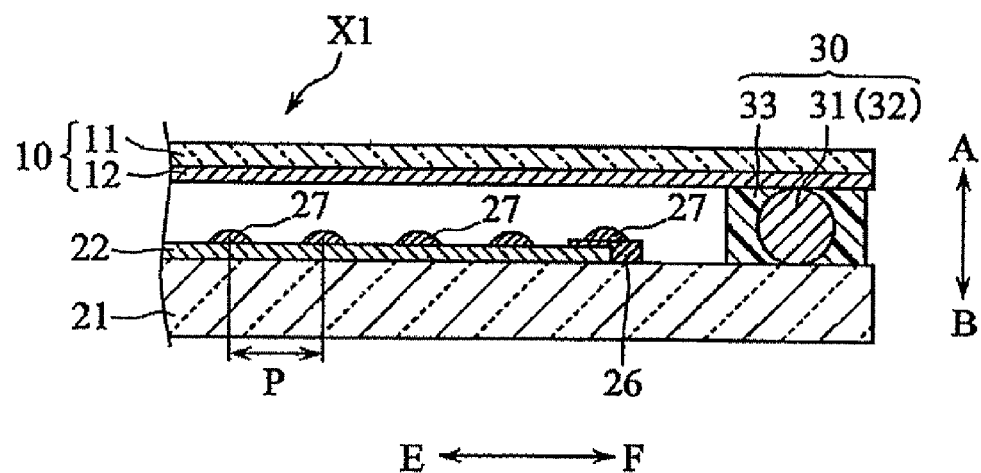
FIG. 2 is a cross sectional view of the touch panel in an assembled state, along line II-II of FIG. 1.
Figure 3:
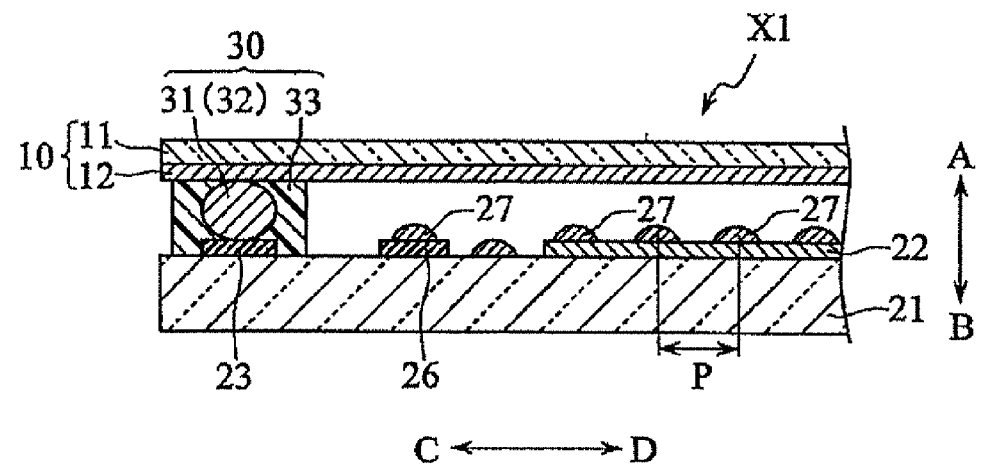
FIG. 3 is a cross sectional view of the touch panel in an assembled state, along line of FIG. 1.
Figure 4:
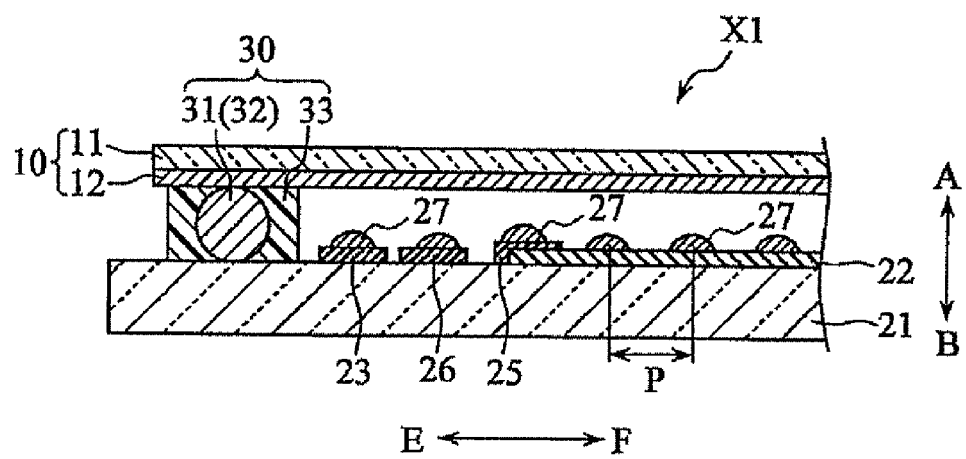
FIG. 4 is a cross sectional view of the touch panel in an assembled state, along line IV-IV of FIG. 1.

X1, X2 Touch panel
Y Touch panel type display device
10 First base
12 First resistance film
20 Second base
22 Second resistance film
23, 24 Inter-substrate connecting wire electrode
27 Dot spacers
28 Insulating layer

BEST MODE(S) FOR CARRYING OUT THE INVENTION

Touch panels and touch panel type display devices according to embodiments of the present invention will now be described with reference to the accompanying drawings.

To begin with, a touch panel and a touch panel type display device according to a first embodiment of the present invention will be described with reference to FIGS. 1 to 9.

Referring to FIGS. 1 to 4, the touch panel X1 includes a first base 10, a second base 20, and an electrically conductive adhesive member 30.

The first base 10 has flexibility on the whole, and is substantially rectangular in a plan view. The shape of the first base 10 in a plan view is not limited to being substantially rectangular, and may be other shapes. The first base 10 includes an insulating substrate 11 and a first resistance film 12.

The insulating substrate 11 is a member serving to support the first resistance film 12, and has translucency in a direction (e.g., an AB direction) intersecting its principal surface and also has electrical insulation properties. Translucency as used herein means permeability to visible light. Examples of the component material of the insulating substrate 11 include glass and translucent plastic. In particular, glass is preferable for the component material of the insulating substrate 11 in view of heat resistance. When using glass as the component material of the insulating substrate 11, the thickness of the insulating substrate 11 is preferably set to be equal to or more than 0.1 millimeter and equal to or less than 0.3 millimeter to ensure sufficient shape stability and flexibility.

The first resistance film 12 contributes to detecting electric potentials at a contact point between the second base 20 and a second resistance film 22, which will be described later, and has translucency in a direction (e.g., an AB direction) intersecting its principal surface. The first resistance film 12 is made of an electrically conductive material having a predetermined electrical resistance, and provided to extend substantially the whole surface of the principal surface of the insulating substrate 11 located on the side indicated by the arrow B. The resistance of the first resistance film 12 is set to be equal to or more than 200 $\Omega/\square$ and equal to or less than 1500 $\Omega/\square$. The thickness of the first resistance film 12 according to the present embodiment is set to be equal to or less than $2.0 \times 10^{-2}$ micrometers to ensure high resistance. Examples of the component material of the first resistance film 12 include ITO (Indium Tin Oxide), ATO (antimony trioxide), tin oxide, zinc oxide, and other translucent electrically conductive members.

The second base 20 is substantially rectangular in a plan view, and arranged to face the first base 10. The shape of the second base 20 in a plan view is not limited to being substantially rectangular, and may be other shapes. The second base 20 includes an insulating substrate 21, the second resistance film 22, inter-substrate connecting wire electrodes 23, 24, wire electrodes 25, 26, and dot spacers 27. The second base 20 also has an externally conductive area 20a that is an area connected to a FPC (Flexible Printed Circuit) not shown, or the like. In the externally conductive area 20a, respective one ends of the inter-substrate connecting wire electrodes 23, 24 and the wire electrodes 25, 26 are located.

The insulating substrate 21 serves to support the second resistance film 22, the inter-substrate connecting wire electrodes 23, 24, the wire electrodes 25, 26, and the plurality of dot spacers 27, and has translucency in a direction (e.g., an AB directions) intersecting a principal surface of the insulating substrate 21 and also has electrical insulation properties. Examples of the component material of the insulating substrate 21 include glass and translucent plastic. In particular, glass is preferable for the component material of the insulating substrate 21 in view of heat resistance. When using glass as the component material of the insulating substrate 21, the thickness of the insulating substrate 21 is preferably set to be more than 0.7 millimeter to ensure sufficient shape stability.

The second resistance film 22 contributes to detecting electric potentials at a contact point between the first base 10 and the first resistance film 12, and has translucency in a direction (e.g., an AB direction) intersecting its principal surface. The second resistance film 22 is made of an electrically conductive material having a predetermined electrical resistance, and provided in an area on the principal surface of the insulating substrate 21 located on the side indicated by the arrow A except for the rim (in an area where the first resistance film 12 is provided in a plan view). Translucency and electrical resistance required for the second resistance film 22 are the same as those for the first resistance film 12. The component material of the second resistance film 22 can be the same as that of the first resistance film 12.

The inter-substrate connecting wire electrodes 23, 24 serve to apply a voltage to the first resistance film 12 through the electrically conductive adhesive member 30, which will be described later, and are provided on the periphery of the second resistance film 22. The inter-substrate connecting wire electrode 23 has one end disposed in the externally conductive area 20a and the other end disposed in an end area on the side indicated by the arrow C of an adhesion area (i.e., the area surrounded by the dashed-two dotted line in FIG. 1) effected by the electrically conductive adhesive member 30, which will be described later, on the insulating substrate 21. The inter-substrate connecting wire electrode 24 has one end disposed in the externally conductive area 20a and the other end disposed in an end area on the side indicated by the arrow D of the adhesion area effected by the electrically conductive adhesive member 30.

The respective resistances between both ends of the inter-substrate connecting wire electrodes 23, 24 are preferably set to be equal to or less than 0.01 time of the resistance between both ends of the first resistance film 12 in view of detection accuracy of the touch panel X1. The inter-substrate connecting wire electrodes 23, 24 are formed of, for example, a metal thin film (line width: equal to or more than 0.5 millimeter and equal to or less than 2 millimeters; thickness: equal to or more than 0.5 micrometer and equal to or less than 2 micrometers) in view of hardness and shape stability. Examples of the metal thin film include an aluminum film, an aluminum alloy film, a multi-layered film of chromium and aluminum films, and a multi-layered film of chromium and aluminum alloy films. When the first resistance film 12 is made of ITO, the metal thin film is preferably made of a multi-layered film of chromium and aluminum films (chromium is interposed between ITO and aluminum) or a multi-layered film of chromium and aluminum alloy films (chromium is interposed between ITO and aluminum alloy) in view of adhesiveness with ITO. Examples of a method for forming the metal thin film include sputtering, evaporation, and chemical vapor deposition (CVD).

Forming the inter-substrate connecting wire electrodes 23, 24 of a metal thin film can make the heights of the uneven surfaces by the inter-substrate connecting wire electrodes 23, 24 and the wire electrodes 25, 26 sufficiently smaller than the heights of the dot spacers 27. This arrangement can sufficiently suppress the occurrence of unwanted contact between the inter-substrate connecting wire electrodes 23, 24 or the wire electrodes 25, 26 and the first resistance film 12 caused by small differences between the heights of the uneven surfaces by the inter-substrate connecting wire electrodes 23, 24 or the wire electrodes 25, 26 and the heights of the dot spacers 27.

Making the metal thin film of an aluminum film, an aluminum alloy film, a multi-layered film of chromium and aluminum films, or a multi-layered film of chromium and aluminum alloy films can make wire resistance relatively low, as well as facilitating the forming of the thin film and the processing (e.g., patterning) of the thin film.

The wire electrodes 25, 26 serve to apply a voltage to the second resistance film 22. The wire electrode 25 has one end disposed in the externally conductive area 20a and the other end disposed in an end of the second resistance film 22 on the side indicated by the arrow E. The wire electrode 26 has one end disposed in the externally conductive area 20a and the other end disposed in an end of the second resistance film 22 on the side indicated by the arrow F.

The respective resistances between both ends of the wire electrodes 25, 26 are preferably set to be equal to or less than 0.01 time of the resistance between both ends of the second resistance film 22 in view of detection accuracy of the touch panel X1. Like the inter-substrate connecting wire electrodes 23, 24, the wire electrodes 25, 26 are formed of a metal thin film (line width: equal to or more than 0.5 millimeter and equal to or less than 2 millimeters; thickness: equal to or more than 0.5 micrometer and equal to or less than 2 micrometers). The metal thin film can be the same as the metal film to form the inter-substrate connecting wire electrodes 23, 24.

The dot spacers 27 serve to suppress unwanted contact between the first resistance film 12 and the second resistance film 22 in an area except for a predetermined position when the first resistance film 12 and the second resistance film 22 come into contact with each other at the predetermined position (when information input is performed). The dot spacers 27 are disposed in a matrix arrayed at substantially regular intervals in the CD directions and the EF directions on the insulating substrate 21. More specifically, the dot spacers 27 are arrayed on the second resistance film 22, predetermined areas of the inter-substrate connecting wire electrodes 23, 24 except for their respective one ends (the area located in the externally conductive area 20a of the second base 20) and their respective other ends (the adhesion area effected by the electrically conductive adhesive member 30), and predetermined areas of the wire electrodes 25, 26 except for their respective one ends (the area located in the externally conductive area 20a of the second base 20).

The dot spacers 27 are preferably difficult to view as well as functioning as a prevention against unwanted contact between the first resistance film 12 and the second resistance film 22, and are each formed in a hemisphere with a diameter of equal to or less than 40 micrometers and a height of equal to or more than 1.0 micrometer and equal to or less than 3.5 micrometers, for example. A distance (arrangement pitch) P between adjacent dot spacers 27 in the CD directions or the EF directions is, for example, equal to or more than 2 millimeters and equal to or less than 4 millimeters.

Figure 5:
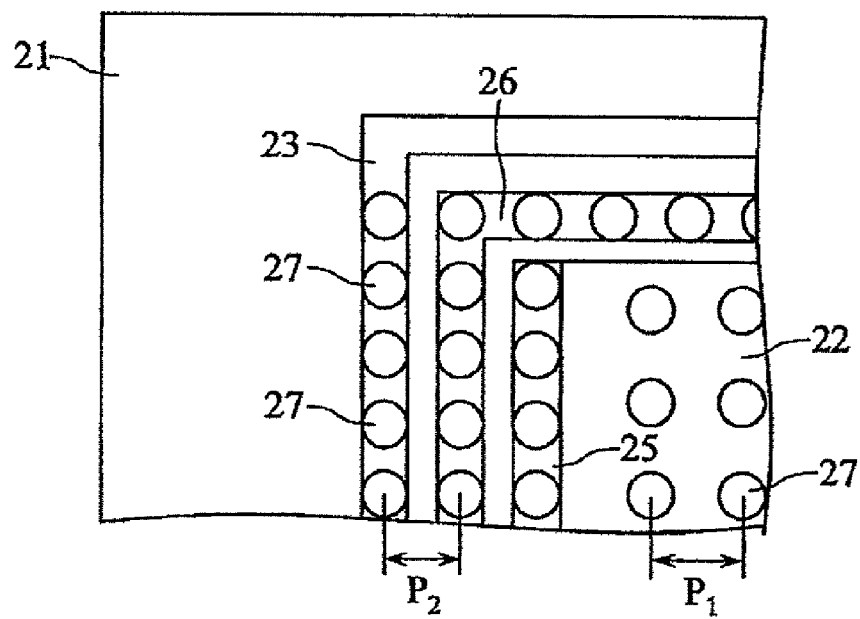
FIG. 5 is a schematic for illustrating another arrangement example of dot spacers.

The dot spacers 27 are not necessarily provided on the insulating substrate 21 (the second base 20), and may be provided on the insulating substrate 11 (the first base 10) instead. The dot spacers 27 are also not necessarily arrayed in a matrix at substantially regular intervals. For example, an arrangement pitch $P_2$ between the dot spacers 27 on the inter-substrate connecting wire electrodes 23, 24 or the wire electrodes 25, 26 may be made smaller than an arrangement pitch $P_1$ between the dot spacers 27 on the second resistance film 22 as illustrated in FIG. 5. This arrangement can more surely suppress unwanted contact between the inter-substrate connecting wire electrodes 23, 24 or the wire electrodes 25, 26 and the first resistance film 12, while maintaining a state in which the first resistance film 12 and the second resistance film 22 can come into contact with each other appropriately at a predetermined position. Therefore, the occurrence of electrical failures in the touch panel X1 can be suppressed more surely. In particular, setting the arrangement pitch $P_2$ to be equal to or less than 200 micrometers can further enhance the above-described advantageous effects.

The dot spacers 27 can be formed, for example, with thermosetting resins or ultraviolet curing resins and by screen printing, offset printing, or photolithography. Using thermosetting resins as the component material of the dot spacers 27 can enhance heat resistance, chemical resistance, and other environment resistance properties, thereby ensuring high long-term reliability, for example. Examples of such thermosetting resins include epoxy resins, unsaturated polyester resins, urea resins, melanine resins, and phenol resins. On the other hand, using ultraviolet curing resins as the component material of the dot spacers 27 can, for example, shorten curing time compared with the use of the thermosetting resins, thereby further enhancing manufacturing efficiency. Examples of the ultraviolet curing resins include acrylic resins and epoxy resins.

The dot spacers 27 may be configured to contain insulating particles. This configuration can enhance the shape stability of the dot spacers 27 without unnecessarily lowering their electrical insulation properties, thereby maintaining the functions of the dot spacers 27 for a longer period of time.

An example of a method for forming the dot spacers 27 will now be described. The following description uses a thermosetting resin as the component material of the dot spacers 27, and the dot spacers 27 are formed on the insulating substrate 21 (the second base 20).

First, a printing plate is disposed on the insulating substrate 21 in an aligned manner. The second resistance film 22, the inter-substrate connecting wire electrodes 23, 24, and the wire electrodes 25, 26 are provided on the insulating substrate 21 in advance. The printing plate has predetermined openings. The openings are formed at predetermined intervals (intervals determined depending on desired arrangement pitches) in facing areas facing the second resistance film 22, predetermined areas of the inter-substrate connecting wire electrodes 23, 24 except for their respective one ends (the area located in the externally conductive area 20a of the second base 20) and their respective other ends (the adhesion area effected by the electrically conductive adhesive member 30), and predetermined areas of the wire electrodes 25, 26 except for their respective one ends (the area located in the externally conductive area 20a of the second base 20).

A thermosetting resin is then printed in predetermined areas on the insulating substrate 21 through the openings of the printing plate. Consequently, the insulating substrate 21 is applied with the thermosetting resin in a manner corresponding to the arrangement of the openings. After the printing plate is removed from the insulating substrate 21, the insulating substrate 21 is heated up to the curing temperature of the thermosetting resin to cure the thermosetting resin. Accordingly, the thermosetting resin is transformed into hemispheres until the thermosetting resin is cured, and is cured in the shape of hemispheres. The dot spacers 27 in the shape of hemispheres are thus provided at predetermined positions on the insulating substrate 21.

In the touch panel X1, the dot spacers 27 are interposed in at least a part of the facing areas where the inter-substrate connecting wire electrodes 23, 24 or the wire electrodes 25, 26 face the first resistance film 12. Therefore, the touch panel X1 can suppress unwanted contact between the inter-substrate connecting wire electrodes 23, 24 or the wire electrodes 25, 26 and the first resistance film 12 even when external force (e.g., pressing force to make inputs with the touch panel) is applied to the touch panel X1, thereby suppressing the occurrence of electrical failures.

In the touch panel X1, the same spacers as those interposed in a facing area (first facing area) between the first resistance film 12 and the second resistance film 22 are interposed in another facing area (second facing area) between the inter-substrate connecting wire electrodes 23, 24 or the wire electrodes 25, 26 and the first resistance film 12. Thus, the spacers interposed in the second facing area can be provided in the same process as that for forming the spacers interposed in the first facing area in the touch panel X1. Therefore, the manufacturing efficiency of the touch panel X1 can be enhanced compared with counterparts to suppress unwanted contact between the inter-substrate connecting wire electrodes 23, 24 or the wire electrodes 25, 26 and the first resistance film 12 in the second facing area by devising the shape of the first resistance film 12 through patterning.

The dot spacers 27 in the touch panel X1 are provided to one of the first base 10 (the insulating substrate 11) and the second base 20 (the insulating substrate 21). Therefore, by using a predetermined printing plate to print and provide the dot spacers 27 in the touch panel X1, the dot spacers 27 interposed in both the first facing area and the second facing area can be provided all at once with a single printing plate. The touch panel X1 thus requires no replacement of a plurality of printing plates, and the manufacturing efficiency of the touch panel X1 can be enhanced accordingly.

Figure 6A:
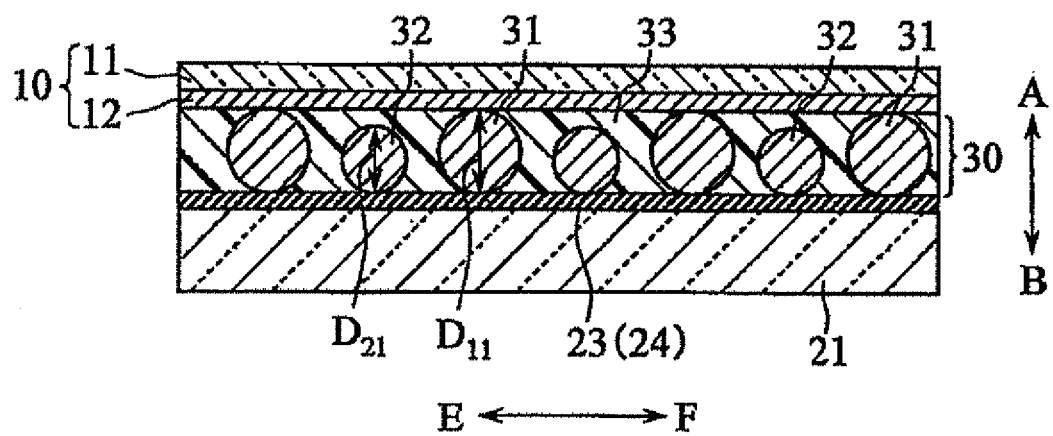
FIG. 6 is a cross sectional view of the touch panel of FIG. 1, to explain a series of processes for bonding a first base and a second base.
Figure 6B:
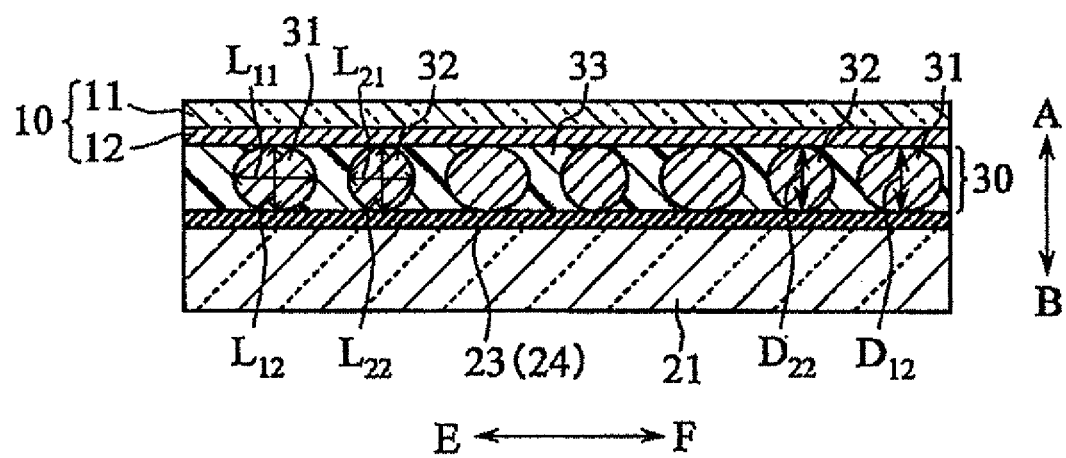

As shown in FIGS. 6A and 6B, the electrically conductive adhesive member 30 serves to join the first base 10 and the second base 20, while ensuring electrical conductivity between the first resistance film 12 and the inter-substrate connecting wire electrodes 23, 24. The electrically conductive adhesive member 30 includes first particles 31, second particles 32, and an adhesive material 33.

The electrically conductive adhesive member 30 is disposed in an area in which the first resistance film 12 is provided and to surround an area in which the second resistance film 22 is provided as viewed in a plan view (viewed in the AB directions). This arrangement reduces the intrusion of foreign matters in the facing area between the first resistance film 12 and the second resistance film 22. Note that the shape in which the electrically conductive adhesive member 30 is disposed is not limited to a frame to surround the second resistance film 22, but various alternatives can be made.

The first particles 31 serve to electrically couple the first resistance film 12 and the inter-substrate connecting wire electrodes 23, 24, and at least a part of the first particles 31 is embedded in the electrically conductive adhesive member 30. The first particles 31 are formed to be substantially spherical to reduce damages on the first resistance film 12, the inter-substrate connecting wire electrodes 23, 24, and the like, which are in contact with the first particles 31. Note that the shape of the first particles 31 is not limited to being substantially spherical, but may be, for example, polyhedral. As the first particles 31, any materials at least having conductivity on their surfaces can be adopted, examples of which include spherical insulating members such as plastic balls having their surfaces coated with an electrically conductive material (e.g., gold, nickel).

The first particles 31 according to the present embodiment have a particle diameter $D_{11}$ in the AB directions before deformation (compression) (see FIG. 6A) that is larger than a particle diameter $D_{21}$ of the second particles 32 in the AB directions before deformation (compression) (see FIG. 6A), which means the first particles 31 are further compressed than the second particles 32. The particle diameter $D_{11}$ of the first particles 31 before compression (see FIG. 6A) is, for example, equal to or more than 2 micrometers and equal to or less than 25 micrometers. A particle diameter $D_{12}$ of the first particles 31 after compression (see FIG. 6B) is, for example, equal to or more than 1.5 micrometers and equal to or less than 24 micrometers. The particle diameter $D_{11}$ of the first particles 31 before compression is not limited to the range above, as long as the diameter is within a range that ensures a sufficient contact area for the first resistance film 12 or the inter-substrate connecting wire electrodes 23, 24 without excessively deforming the first particles 31 themselves.

The first particles 31 are further compressed than the second particles 32 as described above. In other words, the first particles 31 have a larger deformation rate (compression rate) $D_1$ defined by Formula 1 below and a larger aspect ratio $L_1$ defined by Formula 2 below than a deformation rate (compression rate) $D_2$ (see Formula 3) and an aspect ratio $L_2$ (see Formula 4), respectively, of the second particles 32, which will be described later. The deformation rate (compression rate) $D_1$ of the first particles 31 is, for example, equal to or more than 0.03 and equal to or less than 0.3. The aspect ratio $L_1$ of the first particles 31 is, for example, equal to or more than 1.03 and equal to or less than 3.

$$D_1 = (D_{11} - D_{12})/D_{11} \qquad \text{[Formula 1]}$$

$D_1$: Deformation rate (Compression rate) of the first particles
$D_{11}$: Particle diameter of the first particles in the AB directions before compression
$D_{12}$: Particle diameter of the first particles in the AB directions after compression $$L_1 = L_{11}/L_{12} \qquad \text{[Formula 2]}$$

$L_{11}$: Size in the long axis direction (Size in the EF directions in FIG. 6B)

$L_{12}$: Size in the short axis direction (Size in the AB directions in FIG. 6B)

While the first particles 31 are configured to come into direct contact with the first resistance film 12, they are not limited to this configuration. For example, wiring similar to the inter-substrate connecting wire electrodes 23, 24 may be provided on the insulating substrate 11, so that, via this wiring, the first particles 31 and the insulating substrate 11 are electrically coupled.

The second particles 32 contribute to defining the distance between the first base 10 and the second base 20, and at least a part of the second particles 32 is embedded in the electrically conductive adhesive member 30. The second particles 32 are formed to be substantially spherical for a similar reason to that described above for the first particles 31. Note that the shape of the second particles 32 is not limited to being substantially spherical, but may be, for example, polyhedral. As the second particles 32, silica balls (spherical particles mainly made of silicon dioxide) are adopted because they are able to easily define the distance between the first base 10 and the second base 20. Instead, glass fiber or other materials may be used for the second particles 32.

The second particles 32 according to the present embodiment have the particle diameter $D_{21}$ before compression (see FIG. 6A) that is smaller than the particle diameter $D_{11}$ of the first particles 31 before compression (see FIG. 6A), which means the second particles 32 are less compressed (scarcely compressed) than the first particles 31. The particle diameter $D_{21}$ of the second particles 32 before compression (see FIG. 6A) and a particle diameter $D_{22}$ of the second particles 32 after compression are, for example, equal to or more than 1.5 micrometers and equal to or less than 24 micrometers. The particle diameters $D_{21}$, $D_{22}$ of the second particles 32 before and after compression, respectively, are not limited to this range, as long as the diameters make the distance between the first base 10 and the second base 20 fall within a target range.

The second particles 32 also have a smaller deformation rate (compression rate) $D_2$ defined by Formula 3 below and a smaller aspect ratio $L_2$ defined by Formula 4 below than the deformation rate (compression rate) $D_1$ (see Formula 1 above) and the aspect ratio $L_1$ (see Formula 2 above), respectively, of the first particles 31. The deformation rate (compression rate) $D_2$ of the second particles 32 is, for example, equal to or more than 0 and equal to or less than 0.01. The aspect ratio $L_2$ of the second particles 32 is, for example, equal to or more than 1 and equal to or less than 1.01.

$$D_2 = (D_{21} - D_{22})/D_{21} \quad \text{[Formula 3]}$$

$D_2$: Deformation rate (Compression rate) of the second particles $D_{21}$: Particle diameter of the second particles in the AB directions before compression $D_{22}$: Particle diameter of the second particles in the AB directions after compression $$L_2 = L_{21}/L_{22} \quad \text{[Formula 4]}$$

$L_{21}$: Size in the long axis direction (Size in the EF directions in FIG. 6B)

$L_{22}$: Size in the short axis direction (Size in the AB directions in FIG. 6B)

The adhesive material 33 contributes to joining the first base 10 and the second base 20, and is mixed with the first particles 31 and the second particles 32. Examples of the adhesive material 33 include thermosetting resins, e.g., epoxy resins, and ultraviolet curing resins, e.g., acrylic resins. In particular, thermosetting resins are preferably used as the adhesive material 33 from the viewpoint of work efficiency in manufacturing processes.

The touch panel X1 is configured to include two types of particles composed of the first particles 31 and the second particles 32 in the electrically conductive adhesive member 30, but is not limited thereto. Alternatively, only the first particles 31 may be included, which requires preparation of only one type of particles and is thus preferable in view of cost saving.

An example of a method for bonding the first base 10 and the second base 20 with the electrically conductive adhesive member 30 will now be described.

As the electrically conductive adhesive member 30, the uncured adhesive material 33 with the first particles 31 and the second particles 32 mixed therein is used. The following description employs a thermosetting resin as the adhesive material 33. As the first particles 31, spherical insulating members such as plastic balls that have their surfaces coated with an electrically conductive material and are comparatively easy to deform are adopted. As the second particles, silica balls or the like that are comparatively difficult to deform are adopted. In other words, in comparison between the first particles 31 and the second particles 32, the second particles 32 have a larger compressive elastic modulus than that of the first particles 31. As the first particles 31, those having a compressive elastic modulus of, for example, equal to or more than 300 kgf/mm$^2$ (approximately $2.9 \times 10^3$ MPa) and equal to or less than 600 kgf/mm$^2$ (approximately $5.9 \times 10^3$ MPa) are adopted. As the second particles 32, those having a compressive elastic modulus of, for example, equal to or more than 1500 kgf/mm$^2$ (approximately $1.5 \times 10^4$ MPa) and equal to or less than 25000 kgf/mm$^2$ (approximately $2.5 \times 10^5$ MPa) are adopted.

Note that the compressive elastic moduli of the first particles 31 and the second particles 32 mean so-called 10% K-values that are defined by Formula 5 below.

$$10\% \text{ K-value} = (3/2^{1/2}) \cdot F \cdot S^{-3/2} \cdot R^{-1/2} \quad \text{[Formula 5]}$$

F: Load value (Kgf) on particles with 10% compressional deformation

S: Compressional transition (mm) of particles with 10% compressional deformation R: Radius (mm) of particles Values F, S, and R for defining 10% K-values can be measured by compressing particles corresponding to the first particles 31 and the second particles 32 with a micro compression testing machine (model PCT-200, manufactured by Shimadzu Corporation) at room temperature. Such particles corresponding to the first particles 31 and the second particles 32 are compressed, for example, on a smooth end surface of a diamond column having a diameter of 50 micrometers at a compression rate of 0.27 gf/s and a maximum test weight of 10 gf.

Adhesion between the first base 10 and the second base 20 starts with printing (application) of the electrically conductive adhesive member 30 in a predetermined area on the upper surface of the second base 20 (the surface on which the inter-substrate connecting wire electrodes 23, 24 are provided). The predetermined area according to the present embodiment is an area provided to surround the second resistance film 22 (i.e., the area surrounded by the dashed-two dotted line) as can be well seen in FIG. 1.

Next, as shown in FIG. 6A, the first base 10 is aligned with the second base 20 having the electrically conductive adhesive member 30 printed thereon, and the first base 10 and the second base 20 are bonded to each other with the electrically conductive adhesive member 30 therebetween, whereby a bonded structure is produced.

Next, as shown in FIG. 6B, pressure is applied to the first base 10 and the second base 20 included in the thus produced bonded structure in such directions that the both come close to each other. According to the present embodiment, the application of pressure is continued until the second particles 32 come into contact with both the first base 10 and the second base 20, while the first particles 31 are deformed by the first base 10 and the second base 20 in such a manner to increase the deformation rate (compression rate) $D_1$ (see Formula 1) or the aspect ratio $L_1$ (see Formula 1) of the first particles 31.

While the pressurized state is maintained, the electrically conductive adhesive member 30 is heated up to the curing temperature of the adhesive material 33 to cure the adhesive material 33. The adhesive material 33 is thus cured, whereby the first base 10 and the second base 20 are bonded.

An example of a touch panel type display device according to the present invention will now be described with reference to FIGS. 7 to 9.

Figure 7:
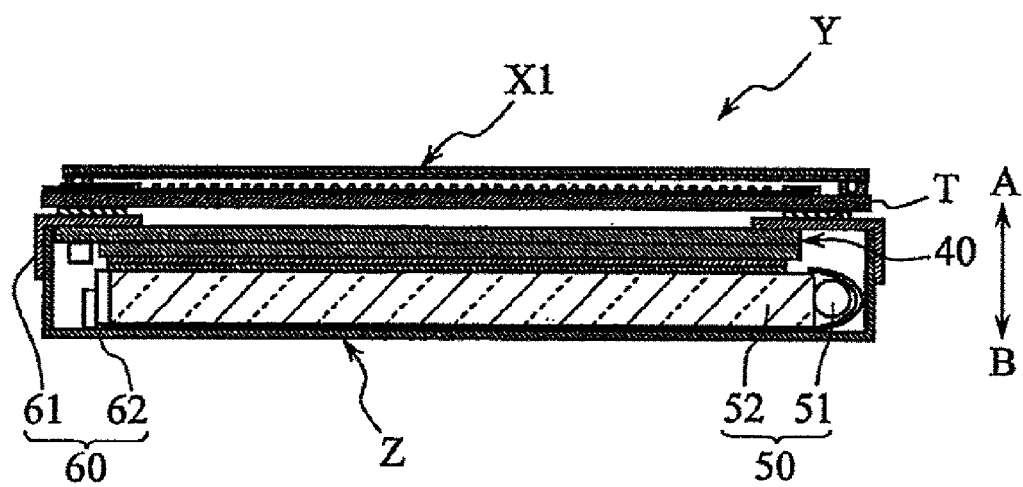
FIG. 7 is a cross sectional view of a schematic configuration of a touch panel type display device including the touch panel of FIG. 1.
Figure 8:
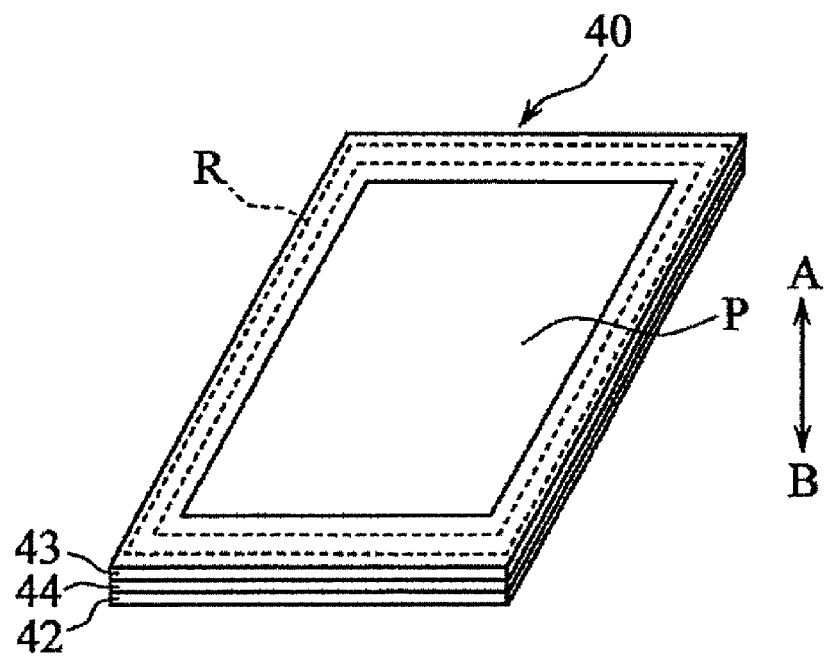
FIG. 8 is a perspective view of a schematic configuration of a liquid crystal display panel of a liquid crystal display unit included in the touch panel type display device of FIG. 7.
Figure 9:
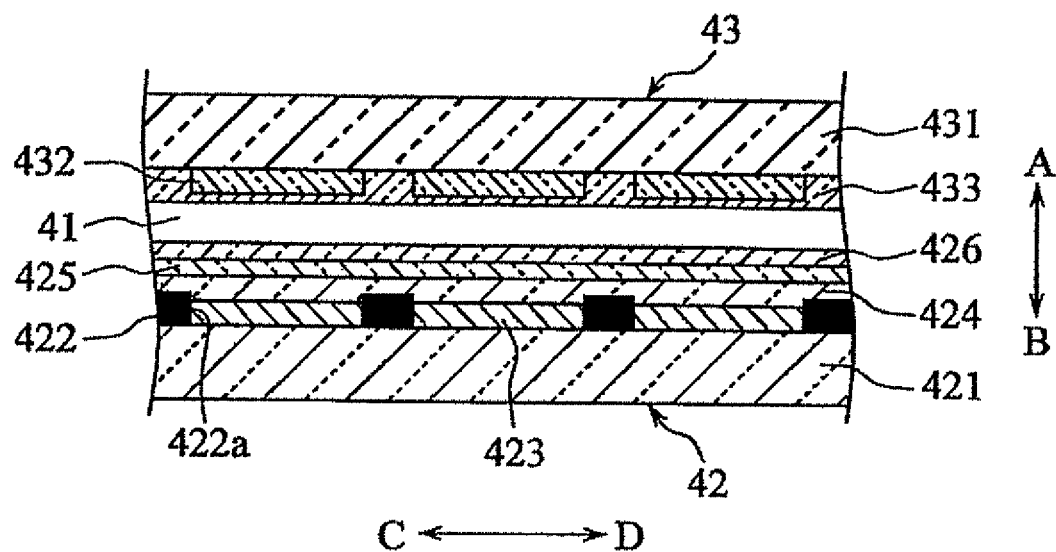
FIG. 9 is an enlarged cross sectional view of a main part of the liquid crystal display panel of FIG. 7.

As shown in FIGS. 7 to 9, this touch panel type display device Y includes the touch panel X1 and a liquid crystal display unit Z.

The touch panel X1 is the one described above with reference to FIGS. 1 to 6. Elements like those in FIGS. 1 to 6 have the same reference numerals in FIG. 7.

The liquid crystal display unit Z includes a liquid crystal display panel 40, a backlight 50, and a casing 60.

The liquid crystal display panel 40 includes a liquid crystal layer 41, a first base 42, a second base 43, and a sealing member 44. The liquid crystal display panel 40 has a display area P configured to include a plurality of pixels to display images. The display area P is prepared by interposing the liquid crystal layer 41 between the first base 42 and the second base 43 and sealing the liquid crystal layer 41 with the sealing member 44.

The liquid crystal layer 41 is a layer configured to contain liquid crystals, which have electrical, optical, mechanical, or magnetic anisotropy and have both the regularity of solid and the liquidity of liquid. Examples of such liquid crystals include nematic liquid crystals, cholesteric liquid crystals, and smectic liquid crystals. In the liquid crystal layer 41, a large number of spacers (not shown) made of particle members may be interposed to keep the thickness of the liquid crystal layer 41 constant.

The first base 42 includes a translucent substrate 421, a light shielding film 422, color filters 423, a planarizing film 424, translucent electrodes 425, and an alignment film 426.

The translucent substrate 421 is a member that contributes to supporting the light shielding film 422 and the color filters 423 and sealing the liquid crystal layer 41. The translucent substrate 421 is configured to be capable of making light pass therethrough appropriately in a direction (e.g., AB directions) intersecting its principal surface. Examples of the component material of the translucent substrate 421 include glass and translucent plastic.

The light shielding film 422 serves to shield light (to make the amount of light transmission equal to or less than a predetermined level), and is provided on the upper surface of the translucent substrate 421. The light shielding film 422 has through-holes 422a that penetrate the film in the film thickness direction (AB directions) to make light pass therethrough. Examples of the component material of the light shielding film 422 include resins (e.g., acrylic resins) and Cr added with dyes or pigments in highly light shielding colors (e.g., black) and carbon.

The color filters 423 serve to selectively absorb light having predetermined wavelengths among incident light on the color filters 423, and selectively make light having predetermined wavelengths pass therethrough. Examples of the color filters 423 include a red color filter (R) to selectively make light having the wavelength of red visible light pass therethrough, a green color filter (G) to selectively make light having the wavelength of green visible light pass therethrough, and a blue color filter (B) to selectively make light having the wavelength of blue visible light pass therethrough. The color filters 423 are prepared by adding dyes or pigments to an acrylic resin, for example.

The planarizing film 424 serves to planarize the uneven surface caused by the disposition of the color filters 423, for example. Examples of the component material of the planarizing film 424 include acrylic resins and other translucent resins.

The translucent electrodes 425 serve to apply a predetermined voltage to liquid crystals in the liquid crystal layer 41 disposed between themselves and translucent electrodes 432 of the second base 43, which will be described later, and have translucency in a direction (e.g., AB directions) intersecting their principal surfaces. The translucent electrodes 425 serve to transmit predetermined signals (image signals), and are provided in plurality to extend mainly in the arrow CD directions. Examples of the component material of the translucent electrodes 425 include ITO, tin oxide, and other translucent electrically conductive members.

The alignment film 426 serves to align liquid crystal molecules of the liquid crystal layer 41, which are oriented in random directions in a macroscopic perspective (with low regularity), in a predetermined direction, and is provided on the translucent electrodes 425. Examples of the component material of the alignment film 426 include polyimide resins.

The second base 43 includes a translucent substrate 431, the translucent electrodes 432, and an alignment film 433.

The translucent substrate 431 is a member that contributes to supporting the translucent electrodes 432 and the alignment film 433 and sealing the liquid crystal layer 41. The translucent substrate 431 is configured to be capable of making light pass therethrough appropriately in a direction (e.g., arrow AB directions) intersecting its principal surface. The component material of the translucent substrate 431 can be the same as that of the translucent substrate 421.

The translucent electrodes 432 serve to apply a predetermined voltage to liquid crystals in the liquid crystal layer 41 disposed between themselves and the translucent electrodes 425 of the first base 42, and are configured to make incident light on one side pass therethrough to the other side. The translucent electrodes 432 serve to transmit signals (scanning signals) for controlling a voltage-applied state (ON) or no voltage-applied state (OFF) of the liquid crystal layer 41, and are provided in plurality in such a manner to extend mainly in a direction perpendicular to the plane of FIG. 9 (e.g., EF directions in FIG. 1). The component material of the translucent electrodes 432 can be the same as that of the translucent electrodes 425.

The alignment film 433 serves to align liquid crystal molecules of the liquid crystal layer 41, which are oriented in random directions in a macroscopic perspective (with low regularity), in a predetermined direction, and is provided on the translucent electrodes 432. The component material of the alignment film 433 can be the same as that of the alignment film 426.

The sealing member 44 serves to seal the liquid crystal layer 41 between the first base 42 and the second base 43, and join the first base 42 and the second base 43 with the both spaced at a predetermined interval. Examples of the sealing member 44 include insulating resins and sealing resins.

The backlight 50 serves to emit light from one side of the liquid crystal display panel X1 to the other side, and employs an edge light unit. The backlight 50 includes a light source 51 and a light guide plate 52. The light source 51 serves to emit light toward the light guide plate 52, and is disposed on a side of the light guide plate 52. Examples of the light source 51 include CFL (Cathode Fluorescent Lamp), LED (Light Emitting Diode), halogen lamp, xenon lamp, and EL (electro-luminescence). The light guide plate 52 serves to guide light emitted by the light source 51 substantially evenly in the whole lower surface of the liquid crystal display panel 40. The light guide plate 52 typically includes a reflection sheet, a diffusion sheet, and a prism sheet. The reflection sheet (not shown) serves to reflect light and is provided on the back surface. The diffusion sheet (not shown) serves to diffuse light to achieve more even surface light emission and is provided on the front surface. The prism sheet (not shown) serves to collimate light in a substantially constant direction and is provided on the front surface. Examples of the component material of the light guide plate 52 include acrylic resins, polycarbonate resins, and other translucent resins. The backlight 50 is not limited to the edge light unit with the light source 51 disposed on a side of the light guide plate 52, and other alternative types, such as a direct backlight unit with the light source 51 disposed on the back surface side of the liquid crystal display panel 40, can be used instead.

The casing 60 serves to house the liquid crystal display panel 40 and the backlight 50, and is configured to include an upper casing 61 and a lower casing 62. Examples of the component material of the casing 60 include: resins, such as polycarbonate resins; metals, such as aluminum; and alloys, such as stainless (SUS).

An example of a method for fixing the touch panel X1 and the liquid crystal display unit Z with a double-faced adhesive tape T will now be described. Note that a fixing member used in the method for fixing the touch panel X1 and the liquid crystal display unit Z is not limited to the double-faced adhesive tape T. Adhesive members, such as thermosetting resins and ultraviolet curing resins, may be used, and other fixing structures for physically fixing the touch panel X1 and the liquid crystal display unit Z may be used, for example.

One side of the double-faced adhesive tape T is attached to a predetermined area on the upper surface of the upper casing 61 included in the liquid crystal display unit Z. According to the present embodiment, the predetermined area is an area R located to surround the display area P of the liquid crystal display unit Z as well illustrated in FIG. 8.

Then, with the touch panel X1 aligned with the liquid crystal display unit Z to which the double-faced adhesive tape T is attached, the insulating substrate 21 included in the touch panel X1 and the upper casing 61 included in the liquid crystal display unit Z are bonded to each other with the double-faced adhesive tape T therebetween. Accordingly, the touch panel X1 and the liquid crystal display unit Z are fixed to each other.

Including the touch panel X1, the touch panel type display device Y has the same advantageous effects as those of the touch panel X1. Specifically, the touch panel type display device Y can suppress unwanted contact between the resistance films 11, 12 and the inter-substrate connecting wire electrodes 23, 24 or the wire electrodes 25, 26 even when external force (e.g., pressing force to make inputs with the touch panel) is applied to the touch panel X1. Furthermore, the manufacturing efficiency of the touch panel type display device Y can be enhanced compared with counterparts to devise the shape of the first resistance film 12 through patterning.

A touch panel according to a second embodiment of the present invention will now be described with reference to FIGS. 10 to 12. Elements like those of the touch panel according to the first embodiment described with reference to FIGS. 1 to 6 have the same reference numerals in these drawings, and thus repeated descriptions will be omitted.

Figure 10:
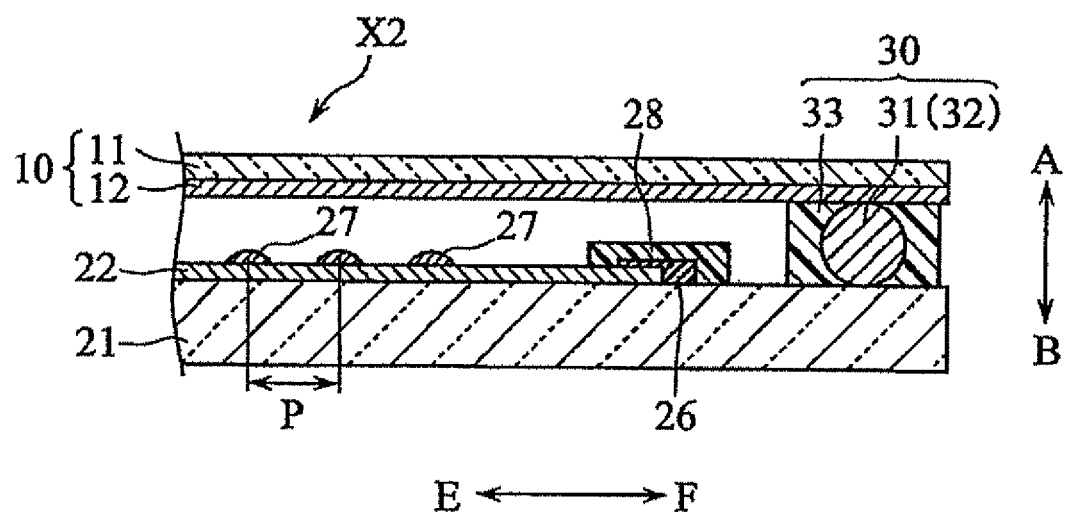
FIG. 10 is a cross sectional view, in the same manner as in FIG. 2, of a touch panel according to a second embodiment of the present invention.
Figure 11:
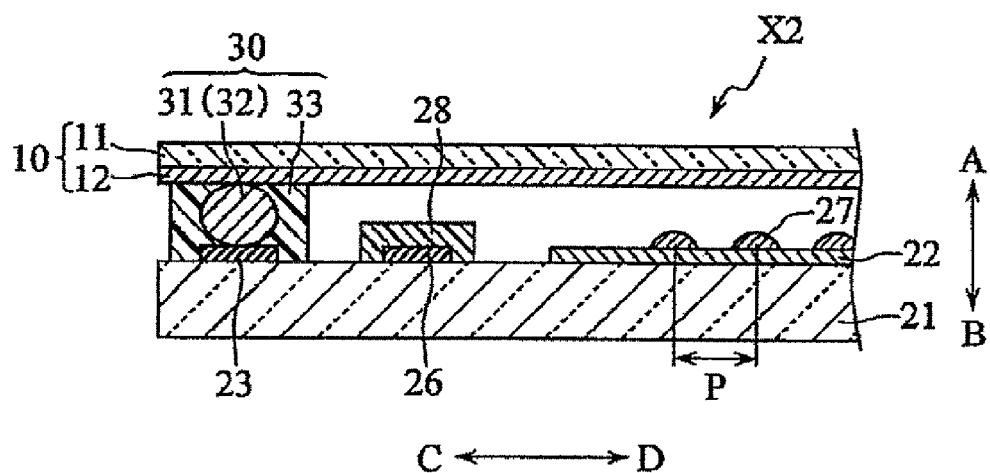
FIG. 11 is a cross sectional view, in the same manner as in FIG. 3, of the touch panel according to the second embodiment of the present invention.
Figure 12:
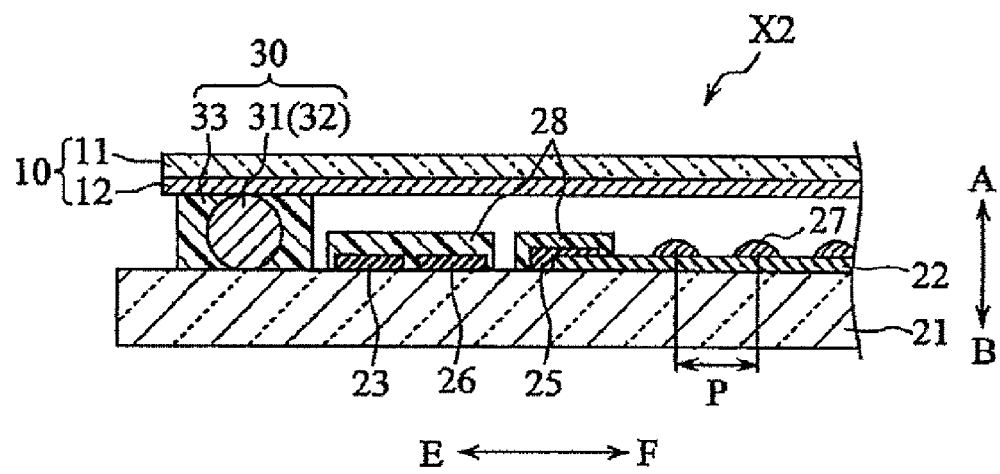
FIG. 12 is a cross sectional view, in the same manner as in FIG. 4, of the touch panel according to the second embodiment of the present invention.

FIGS. 10 to 12 are sectional views of principal components of this touch panel X2. The touch panel X2 illustrated in these drawings can be, like the touch panel X1 according to the first embodiment (see FIGS. 1 to 6), combined with the liquid crystal display unit Z to be applied to the touch panel type display device Y (see FIGS. 7 to 9).

The touch panel X2 differs from the touch panel X1 according to the first embodiment (see FIGS. 1 to 6) in that the dot spacers 27 arrayed in predetermined areas of the inter-substrate connecting wire electrodes 23, 24 except for their respective one ends (the area located in the externally conductive area 20a of the second base 20) and their respective other ends (the adhesion area effected by the electrically conductive adhesive member 30) and in predetermined areas of the wire electrodes 25, 26 except for their respective one ends (the area located in the externally conductive area 20a of the second base 20) are replaced with insulating layers 28.

The insulating layers 28 serve to reduce the occurrence of unwanted electrical contact between the inter-substrate connecting wire electrodes 23, 24 or the wire electrodes 25, 26 and the first resistance film 12. The insulating layers 28 are provided to cover predetermined areas of the inter-substrate connecting wire electrodes 23, 24 except for the area located in the externally conductive area 20a and the adhesion area effected by the electrically conductive adhesive member 30. The insulating layers 28 are also provided to cover predetermined areas of the wire electrodes 25, 26 except for the area located in the externally conductive area 20a.

The component material of the insulating layers 28 can be the same as that of the dot spacers 27. More specifically, examples of the component material of the insulating layers 28 include: thermosetting resins, such as epoxy resins, unsaturated polyester resins, urea resins, melanine resins, and phenol resins; and ultraviolet curing resins, such as acrylic resins and epoxy resins. The thickness of the insulating layers 28 is preferably more than 0 micrometer and equal to or less than 10 micrometers in view of the flatness of the touch panel X2.

An example of a method for forming the dot spacers 27 and the insulating films 28 will now be described. In the following description, a case is assumed where a thermosetting resin is used as the component material of the dot spacers 27 and the insulating films 28, and the dot spacers 27 are formed on the insulating substrate 21.

First, a printing plate is disposed on the insulating substrate 21 in an aligned manner. The second resistance film 22, the inter-substrate connecting wire electrodes 23, 24, and the wire electrodes 25, 26 are provided on the insulating substrate 21 in advance. The printing plate has first openings for forming the dot spacers 27 and second openings for forming the insulating films 28. The first openings are formed at predetermined intervals (intervals determined depending on desired arrangement pitches) in a facing area facing the second resistance film 22. The second openings are formed wholly in facing areas facing predetermined areas of the inter-substrate connecting wire electrodes 23, 24 except for their respective one ends (the area located in the externally conductive area 20a of the second base 20) and their respective other ends (the adhesion area effected by the electrically conductive adhesive member 30), and predetermined areas of the wire electrodes 25, 26 except for their respective other ends (the area located in the externally conductive area 20a of the second base 20).

A thermosetting resin is then printed in predetermined areas on the insulating substrate 21 through the first and second openings of the printing plate. Consequently, the insulating substrate 21 is applied with the thermosetting resin in a manner corresponding to the arrangement of the first and second openings. After the printing plate is removed from the insulating substrate 21, the insulating substrate 21 is heated up to the curing temperature of the thermosetting resin to cure the thermosetting resin. Accordingly, the dot spacers 27 and the insulating layers 28 are provided at predetermined positions on the insulating substrate 21.

The touch panel X2 includes the insulating films 28 interposed in the substantially whole area (the whole area except for areas where electrical conductivity is achieved, e.g., electrically conductive parts) of the facing areas where the inter-substrate connecting wire electrodes 23, 24 or the wire electrodes 25, 26 face the first resistance film 12. Accordingly, the touch panel X2 can sufficiently suppress unwanted contact between the inter-substrate connecting wire electrodes 23, 24 or the wire electrodes 25, 26 and the first resistance film 12 even when external force (e.g., pressing force to make inputs with the touch panel) is applied to the touch panel X2. The touch panel X2 thus can sufficiently suppress the occurrence of electrical failures.

The component material of the insulating films 28 is the same as that of the dot spacers 27. Therefore, the insulating films 28 in the touch panel X2 can be formed in the same process as that for forming the dot spacers 27 without any additional processes for forming the insulating films 28. The touch panel X2, therefore, requires no additional process for forming the insulating films 28, and the manufacturing efficiency of the touch panel X2 can be enhanced accordingly.

The insulating films 28 as well as the dot spacers 27 in the touch panel X2 are provided to the same base (the second base 20 (the insulating substrate 21) according to the present embodiment). Therefore, the insulating films 28 and the dot spacers 27 in the touch panel X2 can be provided all at once with a single printing plate. The touch panel X2 thus requires no replacement of a plurality of printing plates to form the dot spacers 27 and the insulating films 28, and the manufacturing efficiency of the touch panel X2 can be enhanced accordingly.

While specific embodiments of the present invention are described above, the present invention is not limited thereto, and various modifications can be made without departing from the spirit of the invention.

The touch panels X1, X2 may also include a phase difference film arranged on at least one of the first base 10 and the second base 20. The phase difference film is an optical compensation member to convert linear polarized light that has been converted into an elliptical polarization state due to, for example, birefringence of liquid crystals (phase misalignment) into a state closer to linear polarized light from the elliptical polarization state. Examples of the component material of the phase difference film include polycarbonate (PC), polyvinyl alcohol (PVA), polyarylate (PA), polysulfone (Psu), and polyolefin (PO). In particular, as the component material of the phase difference film, PC is preferable in view of consistency with the wavelength dispersion of liquid crystals, and P0, which has a smaller photoelastic coefficient than PC, is preferable in view of adaptability to circularly polarizing plates.

The touch panels X1, X2 may also include a polarizing film arranged on at least one of the first base 10 and the second base 20. The polarizing film serves to selectively make light having a predetermined vibration direction pass therethrough. Examples of the component material of the polarizing film include iodine materials. Such a component is preferable to exert a function of shuttering light passing through the polarizing film.

The touch panels X1, X2 may also include a film that has undergone anti-glare treatment or anti-reflection coating treatment arranged on at least one of the first base 10 and the second base 20. This arrangement can reduce reflection of ambient light.

The insulating substrates 11, 12 of the touch panels X1, X2 may be replaced with any of a phase difference film, a polarizing film, and a film that has undergone anti-glare treatment or anti-reflection coating treatment.

While the electrically conductive adhesive member 30 is provided by a single application to surround the whole of the second resistance film 22 in the touch panels X1, X2, the present invention is not limited thereto. For example, the electrically conductive adhesive member 30 may be configured to have a through-hole communicating an inner part located on the inner side of the electrically conductive adhesive member 30 and an outer part located on the outer side of the electrically conductive adhesive member 30. In this case, after the electrically conductive adhesive member 30 is applied and the first base 10 and the second base 20 are bonded thereby, the air or the like can be injected into the inner part located on the inner side of the electrically conductive adhesive member 30 through the through-hole. The through-hole can be sealed with a similar material to the electrically conductive adhesive member 30 or an electrically non-conductive adhesive member (e.g., an ultraviolet curing resin) after the injection of the air or the like.

While the insulating layers 28 are provided to wholly cover predetermined areas of the inter-substrate connecting wire electrodes 23, 24 except for their respective one ends (the area located in the externally conductive area 20a of the second base 20) and their respective other ends (the adhesion area effected by the electrically conductive adhesive member 30) and predetermined areas of the wire electrodes 25, 26 except for their respective one ends (the area located in the externally conductive area 20a of the second base 20) in the touch panel X2; instead of this arrangement, the insulating layers 28 may be provided to partially cover the predetermined areas within a range to suppress unwanted contact between the inter-substrate connecting wire electrodes 23, 24 or the wire electrodes 25, 26 and the first resistance film 12. This arrangement can reduce the usage amount of the insulating layers 28, thereby saving weight and cost.

In configurations with the insulating layers 28 as in the present embodiment, the position where the through-hole is formed is not limited. By contrast, in configurations with no insulating layers 28, it is preferable to adopt a configuration in which the through-hole is formed in an area where an electrically conductive adhesive member intersects with leading lines of wires and the through-hole is sealed with an electrically non-conductive adhesive member (e.g., an ultraviolet curing resin) to suppress the occurrence of unwanted electrical conduction.

The invention claimed is:
1. A touch panel comprising:
a first base that includes a first resistance film;
a second base that includes a second resistance film;
a first conductor disposed on the second base, that is electrically connected to the first resistance film;
a second conductor disposed on the second base, that is electrically connected to the second resistance film; and a spacer that is interposed in a first facing area where the first resistance film faces the second resistance film, wherein the spacer is also interposed in at least a part of a second facing area where the first resistance film faces the first conductor.

2. The touch panel according to claim 1, wherein the spacer is disposed on the second base.

3. The touch panel according to claim 1, wherein a component material of the spacer is one of a thermosetting resin and an ultraviolet curing resin.

4. The touch panel according to claim 1, wherein the spacer includes an insulating particle.

5. The touch panel according to claim 1, wherein
the spacer comprises a plurality of dot spacers, and
an arrangement pitch of the dot spacers interposed in the second facing area is smaller than an arrangement pitch of the dot spacers interposed in the first facing area.

6. The touch panel according to claim 5, wherein the arrangement pitch of the dot spacers interposed in the second facing area is equal to or less than 200 micrometers.

7. The touch panel according to claim 1, wherein the first conductor comprises a metal thin film.

8. The touch panel according to claim 7, wherein the metal thin film is an aluminum film, an aluminum alloy film, a multi-layered film of chromium and aluminum films, or a multi-layered film of chromium and aluminum alloy films.

9. A touch panel type display device comprising:
a display panel; and
a touch panel according to claim 1 that is arranged in such a manner that a principal surface of the first base or the second base faces a principal surface of the display panel.

10. The touch panel according to claim 1, wherein the first conductor separates from the second resistance film and the second conductor.

11. The touch panel according to claim 1, wherein
the second base further comprises a substrate, and
the second resistance film and the first conductor are directly on the substrate.

12. The touch panel according to claim 1, wherein
a conductive adhesive member is located between the first base and the second base,
the conductive adhesive member electrically connects the first resistance film and the first conductor, and
the spacer interposed in the second facing area is positioned between the conductive adhesive member and the second resistance film.

13. A touch panel comprising:
a first base that includes a first resistance film;
a second base that includes a second resistance film;
a first conductor disposed on the second base, that is electrically connected to the first resistance film;
a second conductor disposed on the second base, that is electrically connected to the second resistance film; and
a spacer that is interposed between the first resistance film and the second resistance film, wherein
the first conductor separates from the second resistance film and the second conductor,
the touch panel further comprises an insulating film that is interposed in at least a part of a facing area where the first resistance film faces the first conductor, and
a component material of the insulating film is same as a component material of the spacer.

14. The touch panel according to claim 13, wherein the insulating film and the spacer are disposed on the second base.

15. The touch panel according to claim 13, wherein a component material of the spacer is one of a thermosetting resin and an ultraviolet curing resin.

16. The touch panel according to claim 13, wherein the spacer includes an insulating particle.

17. The touch panel according to claim 13, wherein the first conductor comprises a metal thin film.

18. The touch panel according to claim 17, wherein the metal thin film is an aluminum film, an aluminum alloy film, a multi-layered film of chromium and aluminum films, or a multi-layered film of chromium and aluminum alloy films.

19. A touch panel type display device comprising:
a display panel; and
a touch panel according to claim 13 that is arranged in such a manner that a principal surface of the first base or the second base faces a principal surface of the display panel.

* * * * *